United States Patent [19]

Iyeta

[11] 4,223,624
[45] Sep. 23, 1980

[54] AUTO-STEERING SYSTEM

[75] Inventor: Motoi Iyeta, Hamamatsu, Japan

[73] Assignee: Nippon Gakki Seizo Kabushiki Kaisha, Japan

[21] Appl. No.: 882,122

[22] Filed: Feb. 28, 1978

[30] Foreign Application Priority Data

| Mar. 2, 1977 | [JP] | Japan | 52-23868[U] |
| Mar. 2, 1977 | [JP] | Japan | 52-23869[U] |
| Mar. 16, 1977 | [JP] | Japan | 52-30909[U] |
| Mar. 16, 1977 | [JP] | Japan | 52-30910[U] |
| Mar. 31, 1977 | [JP] | Japan | 52-38710[U] |

[51] Int. Cl.$^2$ .................. B63H 25/00; B63H 25/36
[52] U.S. Cl. ......................... 114/144 E; 73/1 E; 318/588; 318/591; 364/457
[58] Field of Search ............ 114/144 E; 318/588, 318/590, 591, 647; 364/424, 457; 244/196, 197; 73/1 R, 1 E

[56] References Cited

U.S. PATENT DOCUMENTS

| 2,715,717 | 8/1955 | Keithley | 73/1 R |
| 3,715,571 | 2/1973 | Braddon | 114/144 E |

Primary Examiner—Trygve M. Blix
Assistant Examiner—Reinhard J. Eisenzopf
Attorney, Agent, or Firm—Ostrolenk, Faber, Gerb & Soffen

[57] ABSTRACT

A rudder control circuit for an automatic steering system of the type which includes a known sensor circuit and a reference input circuit selectively connected thereto for easy zero-point calibration separate from the normal control operation is disclosed. The control circuit also includes a high impedance indicator circuit connected to the main feedback line of the control circuit for visual indication of rudder angles with minimized disturbance on the feedback control. The control circuit is further advantageously accompanied by a remote steering unit including a manually adjustable and automatically resettable manual steering circuit for easy steering by single operator.

14 Claims, 10 Drawing Figures

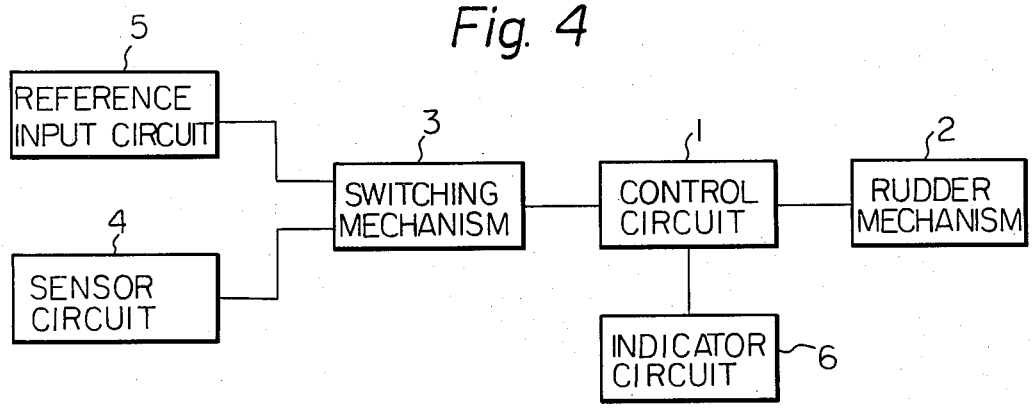
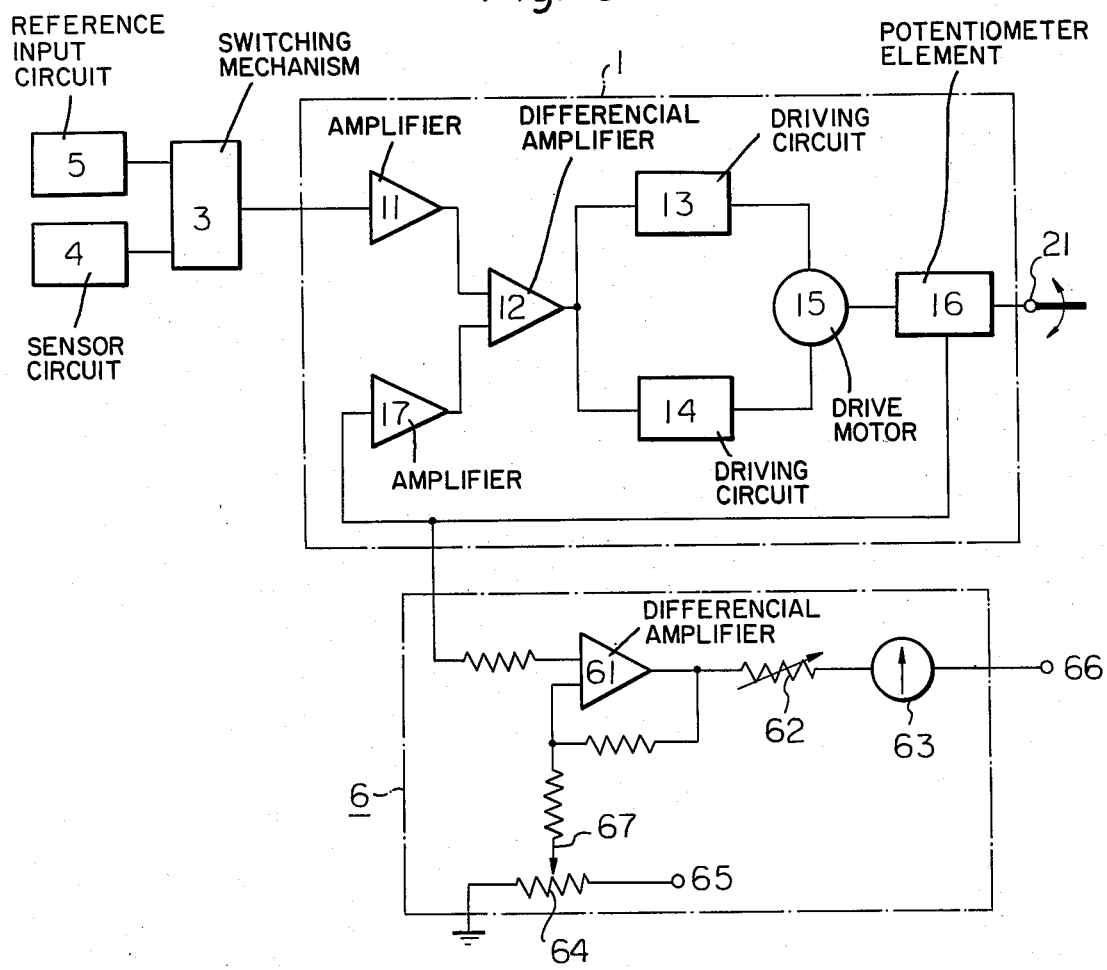

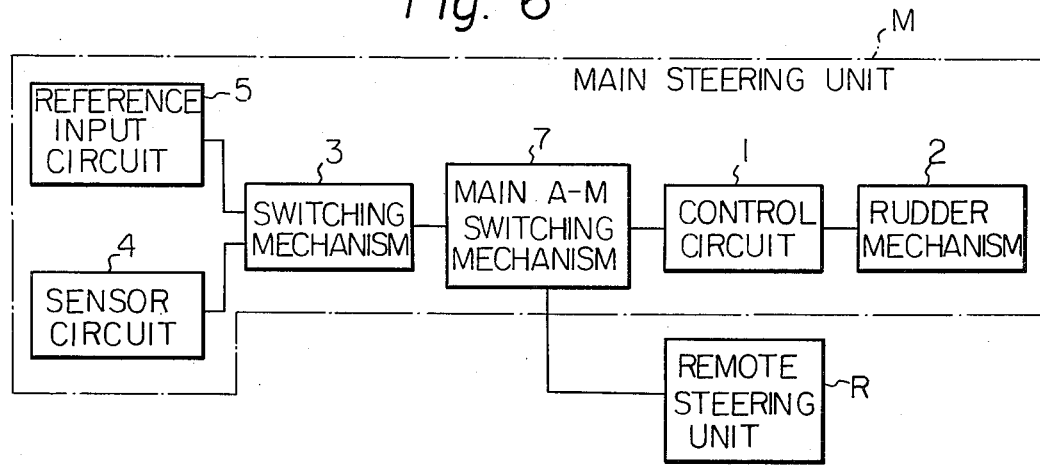
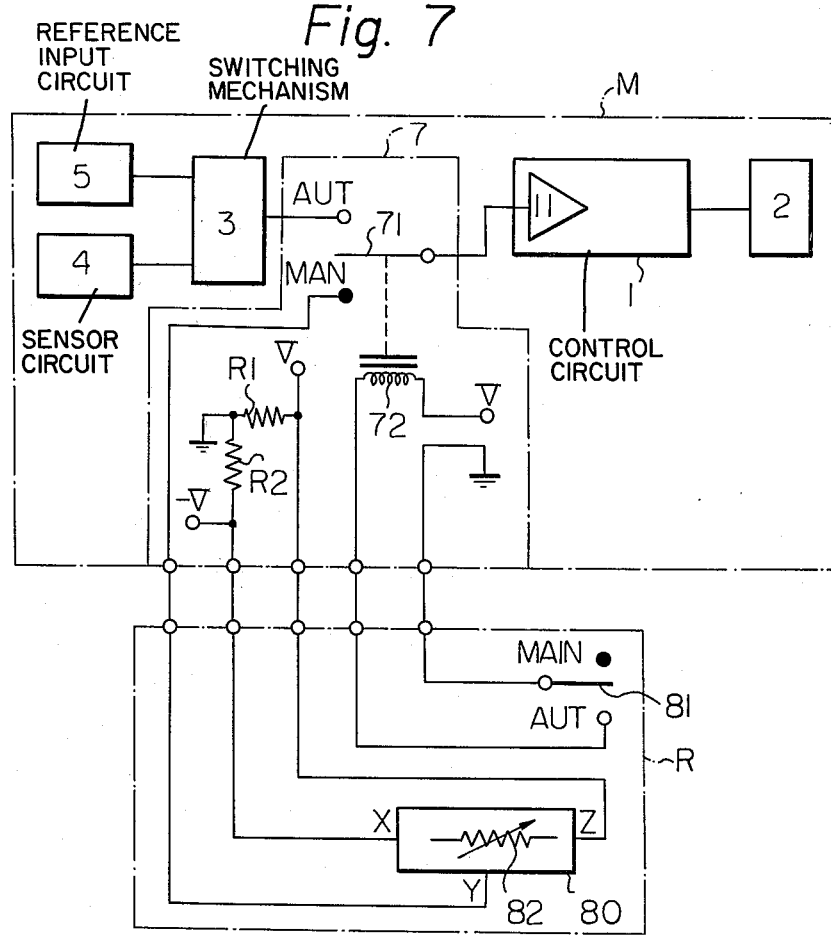

AUTO-STEERING SYSTEM

BACKGROUND OF THE INVENTION

The present invention relates to an improved autosteering system, and more particularly relates to improvements in an auto-steering system for navigation in which a known feedback control circuit automatic controls rudder angles in accordance with signals from a known sensor circuit.

In auto-steering systems for navigation, the condition of various environmental factors influencing navigation such as navigation course, wind heading and/or tideway are sensed by a sensor circuit which produces corresponding signals. These signals are accepted by a control circuit which automatically controls the rudder angle using a feedback control. In order to carry out this control operation, the control circuit must be retained in approximately the zero-condition when the control circuit is inoperative. If this condition is not met, the rudder control can malfunction since turning of the rudder is carried out relative to the standard rudder angle position which is deviated from the true zero-point position, i.e. the neutral axis coinciding the stern direction of the boat equipped with the auto-steering system. As a result of this disorder in the rudder control operation, it is quite impossible, when any malfunction occurs in the system, to confirm whether the system malfunction is caused by any disorder or disorders in the rudder mechanism and/or the sensor circuit or the system malfunction is caused by absence of the zero-point calibration of the control circuit.

BRIEF DESCRIPTION OF THE OBJECTS AND SUMMARY OF THE INVENTION

Accordingly, it is one object of the present invention to enable successful and easy zero-point calibration of the rudder angle control circuit for auto-steering systems.

It is another object of the present invention to enable easy confirmation and discrimination of the causes it malfunctions in the entire system.

In accordance with one preferred aspect of the present invention, the auto-steering system includes a reference input circuit to be selectively coupled to the control circuit via an interposed switching mechanism. During the normal rudder angle control operation, the control circuit is connected to the sensor circuit as in the conventional systems. For the zero-point calibration, the control circuit is connected to the reference input circuit so that the rudder should be registered at the neutral axis by the reference input signal.

In the case of auto-steering systems, the rudder angle is selected and fixed by the operation of the rudder control circuit. However, when any malfunction occurs in the steering system including the control circuit, the resultant actual rudder angle is not always the same as the selected rudder angle. For this reason, it is advantageous to provide an indicator for visually indicating the actual rudder angle so that the operator can take any positive action on the steering system in order to compensate deviation of the actual rudder angle from the selected rudder angle.

In the case of conventional indicators for this purpose, a rudder angle oscillator is mechanically coupled to the rudder mechanism. The oscillator adjusts the resistance of a variable resistor incorporated in an indicator circuit (such as a bridge circuit) such that the actual rudder angle is visually indicated on the indicator activated by the indicator circuit. With this construction of the conventional rudder angle indicators, accuracy in indication is greatly influenced not only by the operational error in the control system but also by the operational error in the rudder angle oscillator. The combined effect of these operational errors considerably lowers the accuracy in the rudder angle indication. In addition, relatively complicated circuit construction of the conventional indicators leads to high production cost and increased maintenance troubles.

It is the other object of the present invention to enable automatic visual indication of the actual rudder angle with an accuracy of a level almost equal to that in the feedback control operation.

It is a further object of the present invention to provide a visual rudder angle indicator whose circuit construction is very simple.

In accordance with another preferred aspect of the present invention, an indicator circuit is coupled to the feedback line of a rudder angle control circuit and the feedback signal is used for activating a rudder angle visual indicator. In this case, however, direct attachment of the indicator circuit to the feedback line of the control circuit tends to cause disorder in the rudder angle control operation through introduction of disturbances and noises into the control circuit, thereby seriously lowering the accuracy in the rudder angle control operation.

In accordance with the other preferred aspect of the present invention, the above-described indicator circuit is given in the form of a high input impedance circuit which operates with extremely small electric current.

On a boat equipped with an auto-steering system, it is standard procedure to include means for to manually carrying out the steering operation in addition to the means for automatically steering the vessel utilizing a rudder angle control circuit. For this manual steering operation, a main steering unit incorporating the rudder angle control circuit is accompanied by a remote steering unit coupled thereto by a cord or cords and incorporating a manual steering circuit. Output from this manual steering circuit can be adjusted as desired by operator's turning an adjuster knob providing on the remote steering unit.

During the normal automatic steering operation, the rudder angle control circuit is connected to a sensor circuit and rudder angle is determined with reference to the output from the sensor circuit. During the manual steering operation, the rudder angle control circuit is connected to the above-described manual steering circuit in the remote steering unit. In order to effect this shifting in the steering mode, the main steering unit is provided with a main A-M (auto-manual) switch which selectively connects the rudder angle control circuit to either one of the sensor and manual steering circuits. The above-described shifting in the steering mode can be carried out by the operator's operating this main A-M switch in the main steering unit.

From the viewpoint of the principal purpose of the remote steering, it is undesirable to require the operator to get to the main steering unit in order to operate the main A-M switch every time shifting in the steering mode is required. This problem is particularly undesirable in the case of small-sized boats on which the operator is always forced to attend to a variety of highly technical operations for well-controlled and safe navigation of the boats.

It is a yet further object of the present invention to free the operator on a boat from the trouble of getting to the main steering unit in order to shift the steering mode.

In accordance with a further preferred aspect of the present invention, a subsidiary A-M (auto-manual) switch is provided on a remote steering unit coupled to a main steering unit incorporating a main A-M switch and both A-M switches are operationally interlocked to each other.

During navigation by the automatic steering operation, a boat does not always sail on a straight course even when the rudder is on the neutral axis coinciding the stern direction. This is often caused by special operational deviation in the rudder mechanism, wind heading and/or tideway. In other words, the actual neutral position of the rudder does not always correspond to the nominal neutral axis of the rudder.

In accordance with a yet further preferred aspect of the present invention, the manual steering circuit of the remote steering unit includes a variable resistor adapted for trimming of the zero-point of the circuit corresponding to deviation of the actual neutral position of the rudder from the nominal neutral axis coinciding the boat stern direction.

The factors influencing the above-described deviation does not fluctuate often in practice. Accordingly, it is rather advantageous that the trimmed state of the manual steering circuit can be provisionally fixed until any large fluctuation occurs in any of the factors.

In accordance with a yet further object of the present invention, the manual steering circuit of the remote steering unit can be provisionally fixed in a trimmed state.

When the manual steering circuit is provided with a variable resistor of a slide brush type operable by turning an adjuster knob arranged on the remote steering unit, the operator needs to reset the adjuster knob to the zero-point after completion of the manual steering. This resetting operation give the busy operator additional troublesome work.

It is a yet further object of the present invention to free the operator from the trouble in resetting the manual steering circuit to the zero-point.

In accordance with a yet further preferred aspect of the present invention, the manual steering circuit of the remote steering unit is automatically resettable to the zero-point.

BRIEF DESCRIPTION OF THE DRAWINGS

FIG. 4 is a block diagram showing the construction of another embodiment of the auto-steering system in accordance with the present invention, FIG. 5 is a circuit diagram, partly utilizing functional blacks, of the auto-steering system shown in FIG. 4, FIG. 6 is a block diagram showing the construction of another embodiment of the auto-steering system in accordance with the present invention, FIG. 7 is a circuit diagram, partly utilizing functional blacks, of the auto-steering system shown in FIG. 6.

DESCRIPTION OF THE PREFERRED EMBODIMENT

Figure 1:
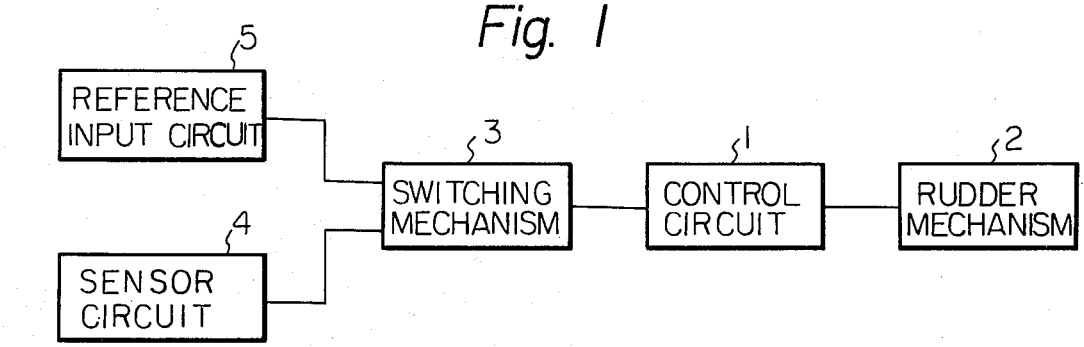
FIG. 1 is a block diagram illustrating the construction of an embodiment of the auto-steering system in accordance with the present invention.

FIG. 1 depicts the basic construction of an embodiment of the auto-steering system in accordance with the present invention. The auto-steering system includes a control circuit 1 (adapted for controlling the operation of a rudder mechanism) which is selectively coupled to either a sensor circuit 4 or a reference input circuit 5 via a switching mechanism 3. The control circuit 1 is operationally coupled to the sensor circuit 4 during the normal control operation in order to control the operation of the rudder mechanism 2 in accordance with input signals passed from the sensor circuit 4, whereby enabling navigation by automatic steering. Prior to starting the control operation, the control circuit 1 is operationally coupled to the reference input circuit 5 for the purpose of carrying out the zero-point calibration as hereinafter described in more detail.

Figure 2:
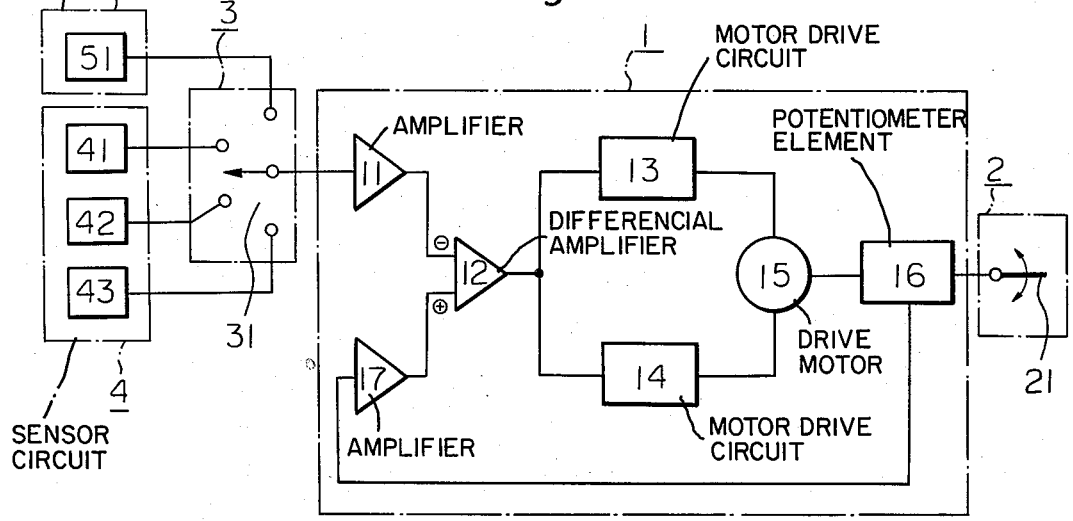
FIG. 2 is a circuit diagram, partly in black box, of the auto-steering system shown in FIG. 1.

FIG. 2 depicts a further detailed construction of the auto-steering system shown in FIG. 1. As shown therein, control circuit 1 includes an amplifier 11 whose output terminal is coupled to the negative input terminal of a differential amplifier 12. The output terminal of the amplifier 12 is coupled to a drive motor 15 via a pair of motor driving circuits 13 and 14 each of which is provided with a kind of low-pass filter in order to cut off high frequency deviation signals. A potentiometer element 16 is inserted between the drive motor 15 and the rudder mechanism 2. The output terminal of the potentiometer element 16 is coupled to the positive terminal of the above-described differential amplifier 12 via an amplifier 17. Here, the potentiometer-element 16 operates in proportion to the rotation angle of the drive motor 15 as hereinafter described in more detail. The amplifier 17 is adapted for negative feed-back of the output from the drive motor 15. That is, the inputs to the differential amplifier 12 from the amplifiers 11 and 17 are inverse in phase to each other.

The rudder mechanism 2 includes a rudder 21 operationally connected to the output shaft of the drive motor 15 so that the rudder turns and deviates from the neutral axis thereof in accordance with the rotation angle of the drive motor 15, the neutral axis coinciding with the stern direction of the boat for which the rudder 21 is used. The extent of turning, i.e. the magnitude of deviation, of the rudder 21 from the neutral axis is proportional to the distance of movement of the potentiometer-element 16 from the neutral axis as hereinafter described in more detail.

The switching mechanism 3 includes a multi-contact switch 31 which, in the case of illustrated embodiment, possesses a set of five contacts. One of the contacts is coupled to the input terminal of the amplifier 11 of the control circuit 1, the other of the contacts is coupled to a reference input element 51 of the reference input circuit 5 and remaining contacts are coupled to elements 41, 42 and 43 of the sensor circuit 4, respectively.

The reference input element 51 takes the form of an electric circuit including, for example, a resistor and applies a prescribed magnitude of reference input signal, e.g. a voltage signal, to the control circuit 1.

The elements 41, 42 and 43 of the sensor circuit 4 are given, for example, in the form of a navigation course finder, a wind heading finder and a tideway finder, respectively. Upon sensing factors influencing the navigation mode of the associated boat such as navigation course, wind heading and tideway, each of the elements 41, 42 and 43 applies corresponding signal to the control circuit 1 for determination of the rudder angle at which the rudder 21 should be registered.

Figure 3:
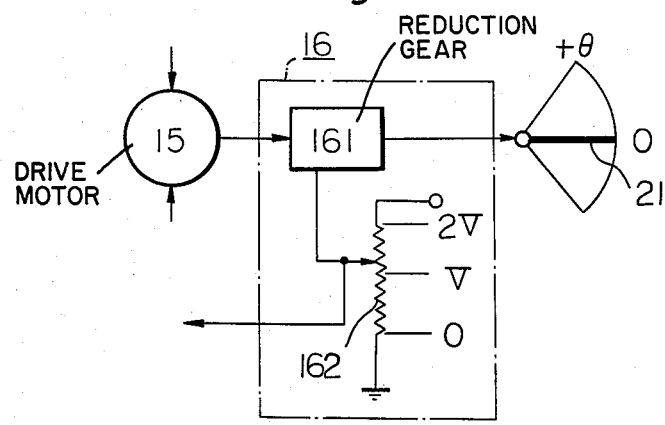
FIG. 3 is a circuit diagram of an embodiment of the potentiometer element used in the auto-steering system shown in FIG. 2.

One embodiment of the above-described potentiometer-element 16 is shown in FIG. 3, in which rotation of the output shaft of the drive motor 15 is transmitted to a variable resistor 162 via a suitable reduction gear mechanism 161 so that the movement of the slide arm of variable resistor 162 is proportional to the rotation of the drive motor 15. In other words, the moving distance of the slide arm of variable resistor 162 should be proportional to the rotation angle of the drive motor 15 and the moving direction of the slide arm of variable resistor 162 corresponding to the rotating direction of the drive motor 15. The correlation is so designed that the slide arm of variable resistor 162 will travel over distances V on both sides of the neutral axis thereof, when the rudder 21 turns over angles $\theta$ on both sides of the neutral axis thereof. In other words, a voltage drop 2 V caused by movement of the slide arm of variable resistor 162 corresponds to a turning angle $2\theta$ caused by movement of the rudder 21. Further, the resistor 162 should be registered at the neutral axis (the electric potential=V) when the rudder 21 is registered at the neutral axis (turning angle=0).

In the auto-steering system of the present invention having the above-described construction, the normal control operation is carried out in the following fashion.

For the normal control operation, the switch 31 is set so as to connect the amplifier 11 to one of the elements, e.g. the navigation course finder 41, of the sensor circuit 4. The signal, e.g. the voltage signal, from the sensor circuit 4 is passed to the differential amplifier 12 via the switch 31 and the amplifier 11 and, depending on the polarity thereof, actuates either one of the motor driving circuits 13 and 14, the polarity of the signal determining the turning direction of the rudder 21 about the neutral axis (turning angle 0). Upon this actuation, the drive motor 15 is driven for rotation in the clockwise or counterclockwise direction depending on the polarity of the above-described signal. Then, the above-described potentiometer element 16 operates in proportion to the rotation angle of the drive motor 15 in order to apply a feedback signal to the differential amplifier 12 via the amplifier 17. Here, the feedback signal is inverse in phase to the signal from the amplifier 11.

As the rudder 21 completes turning over a turning angle corresponding to the signal from the sensor circuit 4, the input signal from the amplifier 11 and that from the amplifier 17 become identical to each other in their absolute values retaining inverse phases. Thus, the two inputs offset each other to make the output from the differential amplifier zero and the drive motor 15 ceases its rotation. In other words, the drive motor 15 rotates over a rotation angle corresponding to the input signal from the amplifier 11 only in order to determine the rudder angle.

As the change in navigation course is completed and the resultant actual navigation course of the boat coincides the course determined on the basis of the input signal from the sensor circuit 4, the signal from the sensor circuit 4 becomes zero and, accordingly, the input signal to the differential amplifier 12 from the amplifier 11 becomes zero, also. In this case of the example shown in FIG. 3, the electric potential of the input signal from amplifier 11 assumes V volts. At this stage of the process, the rudder 21 is off the stern direction, i.e. the neutral axis of the boat after completing the change in the navigation course and the potentiometer element 16 now generates a signal corresponding to this deviation of the rudder 21 from the neutral axis, which is again proportional to the rotation angle of the motor 15. This signal is again passed to the differential amplifier 12 via the amplifier 17. As described already, this signal is inverted in phase and the input signal from the amplifier 11 is now zero (i.e., V volts). Therefore, the drive motor 15 rotates over a rotation angle corresponding to the input signal from the amplifier 17 in the direction opposite to that before the change in the navigation course and thereby the rudder 21 turns towards the neutral axis.

Upon registration of the rudder 21 at the neutral axis the drive motor 15 ceases the rotation and, accordingly, the rudder 21 ceases the turning. That is, the boat sails straightly along the selected navigation course. It will be well understood that the above-described process is fully that of the ordinary negative feedback operation.

For the zero-point calibration, it is first assumed that the rudder 21 is located fairly on the neutral axis and, therefore, the variable resistor 162 in FIG. 3 is registered at the neutral axis (electric potential=V volts) also.

The switch 31 is set so that the amplifier 11 is connected to the reference input element 51 of the reference input circuit 5 and a reference input signal of a prescribed magnitude, e.g. an electric potential V, is applied to the differential amplifier 12 via the amplifier 11. Concurrently with this, the potentiometer-element 16 applies an inverted input signal of an electric potential $-V$ to the differential amplifier 12 via the amplifier 17. Thus, the input signals from both amplifiers 11 and 17 offset to each other, the output signal from the differential amplifier 12 becomes zero, the drive motor 15 does not start to rotate and the rudder 21 retains its position on the neutral axis.

It is next assumed that, at the timing of the zeropoint calibration, the rudder 21 is off the neutral axis and located at the position deviated from the neutral axis by a turning angle $\theta/2$. Under this situation, the variable resistor 162 is located at the position of the electric potential 1.5 V. The switch 31 is set so that the amplifier 11 is connected to the reference input element 51 of the reference input circuit 5 and a reference input signal of an electric potential V is applied to the differential amplifier 12 via the amplifier 11. Concurrently with this, the potentiometer-element 16 applies an inverted input signal of an electric potential $-1.5$ V to the differential amplifier 12 via the amplifier 17. Thus, the output signal from the differential amplifier 12 is given in the form of an electric potential difference $-0.5$ V between the input signals from both amplifiers 11 and 17. This output signal from the differential amplifier 12 actuates the drive motor 15 for rotation over a rotation angle in order to turn the rudder 21 towards the neutral axis. As the rudder 21 is registered at the neutral axis, the feedback signal of an electric potential $-V$ from the amplifier 17 offsets the reference input signal of an electric potential V from the amplifier 11, the output signal from the differential amplifier 12 becomes zero, the drive motor 15 ceases rotation and the rudder 21 is registered at the neutral axis. In other words, deviation of the rudder 21 from the neutral axis is corrected and the zero-point calibration is completed.

In the foregoing embodiment, the turning ambit of the rudder 21 is selected over angles $\theta$ on both sides of the neutral axis, the moving ambit of the variable resistor 162 is selected over voltages V on both sides of the neutral axis and the magnitude of the reference input signal is fixed to an electric potential V. However, relative magnitudes of the three values can be adjusted variously in accordance with the practical conditions under which the auto-steering system in accordance with the present invention is used. In conclusion, the relationship in magnitude should be fixed so that the potentiometer-element 16 generates an output signal of a magnitude corresponding to the neutral axis thereof when the rudder 21 is located on the neutral axis and the inverted feedback signal from the potentiometer-element 16 offsets the reference input signal, thereby making the output signal from the differential amplifier zero.

In accordance with the present invention, zero-point calibration of the control circuit in the auto-steering system can be carried out at any time by a simple switching operation. Thus, the control circuit is always kept in a fairly zero-point calibrated state. When any malfunction occurs in the auto-steering system, the cause for the malfunction can be very reliably located by simply checking the sensor circuit and the rudder mechanism. Therefore, there is no danger that a disorder or disorders in these parts will be confused with a disorder in the control circuit itself.

A modified embodiment of the auto-steering system in accordance with the present invention is shown in FIG. 4, in which the control circuit 1 is accompanied by an indicator circuit 6 adapted for visual indication of the actual rudder angle and advantageously given in the form of a high input impedance circuit for the minimum disturbance on the feedback signal in the control circuit.

One embodiment of the construction of the indicator circuit 6 is shown in more detail in FIG. 5, in which the indicator circuit 6 includes a differential amplifier 61, an indicator 63 and a variable resistor 64 adapted for zero-point calibration. One input terminal of the differential amplifier 61 is coupled to the feedback line of the control circuit 1 and the other terminal thereof is coupled to a variable resistor 64 via a brush 67. The output terminal of the differential amplifier 61 is coupled to the indicator 63 via a variable resistor 62 adapted for moving ambit adjustment of the indicator hand.

The indicator 63 is preferably so adjusted that the indicator hand should be registered at the zero-point at the middle of the indicator scale when the rudder 21 is located fairly on the neutral axis. As an exceptional case which is rather rare in practice, the zero-point of the indicator scale may be more or less deviated from the midway position when the turning direction of the rudder 21 is limited to one side of the neutral axis for any reason.

For the zero-point calibration, the control circuit 1 is kept in the inoperative state. A voltage V/2 is applied to a terminal 66 and a voltage V is applied to a terminal 65. Upon this condition, the variable resistor 64 is adjusted such that the indicator hand points to the middle of the indicator scale. When the indicator 63 is accompanied by no special mechanical deviation, this zero-point calibration can be attained by simply registering the brush 67 at the middle of the entire length of the resistor 64. However, since it is quite usual that the indicator 63 has some mechanical deviation, correct zero-point adjustment cannot be attained in practice simply by registering the brush 67 at the middle of the entire resistor length.

The variable resistor 62 determines the maximum moving ambit of the indicator hand, i.e. the maximum voltage magnitude to be applied to the indicator 63. Here, it should be noted that the moving angle of the indicator hand does not always coincide with the actual rudder angle. The moving angle of the indicator hand is proportional to the actual rudder angle only. So, when the maximum moving angle of the indicator hand is once selected, it is necessary to set the indicator scale in accordance with the maximum moving angle so selected. In one example of this setting, the maximum moving angle of the indicator hand is fixed to $\pm 60$ degrees for the maximum rudder angle of $\pm 90$ degrees. In this case, the actual rudder angle is of $\pm 45$ degrees when the maximum moving angle of the indicator hand is $\pm 30$ degrees, respectively.

In the case of the above-described embodiment, the feedback signal in the control circuit is directly utilized as an input for actuating the indicator and, therefore, visual indication of the rudder angle can be carried out with an accuracy equal to that in the control operation. The indicator circuit is very simple in the construction thereof. Use of the high input impedance circuit for the indication successfully avoids undesirable disturbance on the feedback signal processed in the control circuit.

A further modified embodiment of the auto-steering system in accordance with the present invention is shown in FIGS. 6 and 7, in which the system is adapted for remote steering of the boat, too. That is, the main steering unit M including the control circuit 1 for the rudder is accompanied by a remote steering unit R via a suitable electric wire or wires. In the drawings, the contacts of switches marked as "AUT" are used for automatic steering whereas those of switches marked as "MAN" are used for manual steering using the remote steering unit R.

As shown in FIG. 6, the main steering unit M includes a main A-M (auto-manual) switching mechanism 7 inserted between the switching mechanism 3 and the control circuit 1, the mechanism 7 being adapted for switching between the automatic and manual steering of the boat for which the auto-steering system in accordance with the present invention is used. The control circuit 1 in the main steering unit M is coupled to the remote steering unit R via the above-described main A-M switching mechanism 7.

As shown in FIG. 7, the remote steering unit R includes a subsidiary (auto-manual switch 81) having two contacts AUT and MAN and a manual steering circuit 80 having three terminals X, Y and Z. The manual steering circuit 80 includes a variable resistor 82 whose resistance can be adjusted as desired by manually operating a knob not shown.

Figure 8:
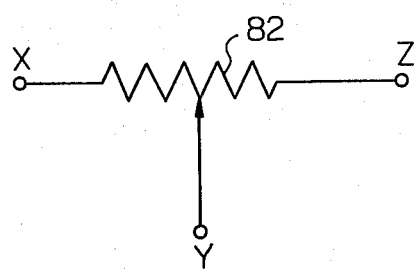
FIG. 8 is a circuit diagram of an embodiment of the manual steering circuit used in the auto-steering system shown in FIG. 7, and FIGS. 9 and 10 are circuit diagrams of other embodiments of the manual steering circuit.

One practical embodiment of the variable resistor 82 takes the form of a slide type variable resistor such as shown in FIG. 8.

The main A-M switching mechanism 7 includes a main A-M switch 71 having two input contacts AUT and MAN, the first contact AUT is coupled to the output contact of the switching mechanism 3 and the second contact MAN is coupled to the terminal Y of the manual steering circuit 80, i.e. the slide brush terminal in the case of the resistor construction shown in FIG. 8. The output contact of the main A-M switch 71 is coupled to the input terminal of the amplifier 11 in the control circuit 1 (see FIG. 2). A relay 72 is inserted between the contact AUT of the subsidiary A-M switch 81 and the electric source of a potential V in an arrangement operable on the main A-M switch 71. When the relay 72 is active, the automatic steering contact AUT of the switch 71 is closed whereas the manual steering contact MAN is closed when the relay 72 is inactive.

The terminal Z of the manual steering circuit 80 is coupled to an electric source of a potential V and the terminal X is to an electric source of a potential −V.

For the automatic steering, the automatic steering contact AUT of the subsidiary A-M switch 81 is closed in order to activate the relay 72 and, upon activation of the relay 72, the automatic steering contact AUT of the main A-M switch 71 is closed. Thus, the amplifier 11 of the control circuit 1 is connected to the sensor circuit 4 via the switch mechanisms 71 and 3 for the normal control operation. When the actual navigation course of the boat is fairly on the initially selected one, the output signal from the sensor circuit 4 is zero. When the actual navigation course of the boat is off the initially selected one, a corresponding signal is output from the sensor circuit 4.

For the manual steering operation, the manual steering contact MAN of the subsidiary A-M switch 81 is closed in order to make the relay 72 inactive and the manual steering contact MAN of the main A-M switch 71 is closed. Now, the amplifier 11 of the control circuit 1 is disconnected from the sensor circuit 4 and connected to the slide brush terminal Y of the manual steering circuit 80 (see FIG. 8). As described already, the X-terminal of the variable resistor 82 is kept at an electric potential −V and the Z-terminal at an electric potential +V. A pair of resistors R1 and R2 are inserted between the both terminals X and Z in series connection and the connection point between the resistors R1 and R2 is grounded. Thus, a bridge output is obtained between the slide brush terminal Y and the above-described grounded connection point. In the case of the manual steering operation, the resistance of the variable resistor 82 is set by the manual operation on the adjustor knob (not shown). Turning of the rudder is carried out in accordance with the above-described bridge output from the manual steering circuit 80.

As described already, the manual steering circuit 80 includes the manually adjustable variable resistor 82 adapted for setting the input to the control circuit 1 during the manual steering operation. However, a boat will not always sail in a straight direction even when the rudder is located on the neutral axis meeting the stern direction of the boat. Such deviation from the straight sailing is caused by mechanical deviation special to the rudder mechanism, wind heading and/or tideway. In other words, the actual neutral position of the rudder does not always meet the nominal neutral axis thereof.

Figure 9:
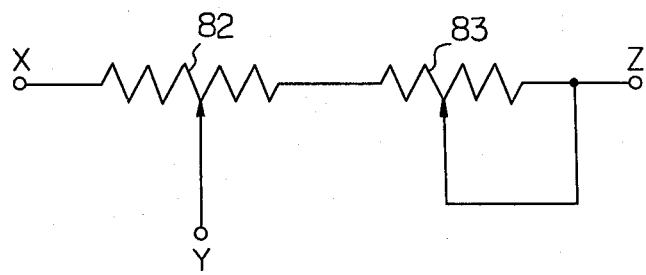

An arrangement shown in FIG. 9 is proposed in order to compensate the deviation of the above-described kind. In the illustrated construction, an additional variable resistor 83 adapted for trimming is inserted in series between the variable resistor 82 and the Z-terminal. By adjusting the resistance of the additional variable resistor 83, the zero-point of the manual steering circuit 80 is fixed in accordance with the deviation of the actual rudder neutral position from the nominal rudder neutral axis.

In accordance with the above-described embodiment, the steering mode of the boat can be freely shifted from automatic to manual and vice versa. In addition, since the main A-M switch of the main steering unit is operationally locked to the subsidiary A-M switch of the remote steering unit, the above-described shifting in the steering mode can fairly be carried out by simply operating the adjustor knob arranged on the remote steering unit in the hand of the operator.

Figure 10:
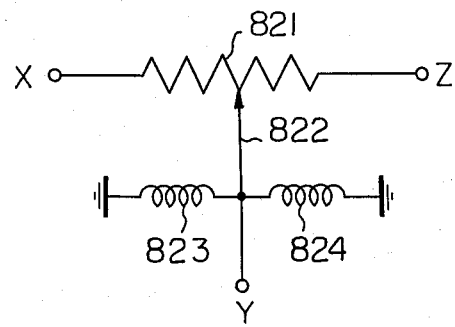

FIG. 10 depicts a further modified embodiment of the auto-steering system in accordance with the present invention in which zero-point resetting of the manual steering circuit is carried out quite automatically. In this case, the resistor element 821 is accompanied by a slide brush 822 movable over the entire length thereof and the slide brush 822 is associated with a pair of springs 823 and 824 which urge the slide brush 822 to move in opposite directions along the resistor element 821. The strength of the springs 823 and 824 should be so selected that when no external force is imposed upon the slide brush 822, the spring forces balance to each other and the slide brush 822 is registered at the zero-point on the resistor element 821, which corresponds to registration of the rudder at the neutral axis. When external force is imposed upon the slide brush 822 by operating the adjuster knob (not shown), the slide brush 822 deviates from the above-described zero-point while overcoming the spring force. When the external force acting on the slide brush 822 is cancelled, that is, the operator's hand on the adjuster knob is removed, the slide brush 822 quite automatically resumes its initial zero-point position on the resistor element 821 due to the repulsion of the springs 823 and 824.

In accordance with this embodiment, zero-point resetting of the manual steering circuit can be carried out quite automatically simply by operator's detaching the adjuster knob on the remote steering unit after shifting of the steering mode, thereby considerably simplifying the remote steering operation and freeing the operator from trouble in the resetting work.

In a further variant of the auto-steering system in accordance with the present invention, it is employable to combine the zero-point trimming construction shown in FIG. 9 with the automatic zero-point resetting construction shown in FIG. 10.

Further, in the case of the zero-point trimming construction shown in FIG. 9, the above-described factors causing the deviation of the actual rudder neutral position from the nominal rudder neutral axis do not in general fluctuate so often. So, once the zero-point trimming is completed, it is rather advantageous to provisionally fix the trimmed state of the manual steering circuit. For this effect, the additional variable resistor 83 shown in FIG. 9 may be accompanied by a suitable mechanism for provisionally fixing the selected resistance.

I claim:

1. An improved auto-steering system for controlling the angular orientation of a rudder with respect to a neutral reference axis, said auto-steering system comprising:
   a control circuit for adjusting the angular orientation of said rudder as a function of input signals applied to an input terminal thereof;
   a sensor circuit including means for generating desired angular orientation input signals representative of a desired angular orientation of said rudder responsive to environmental factors influencing navigation;

a reference input circuit which produces a predetermined reference input signal indicative of said neutral reference axis of said rudder; and a switching mechanism for selectively applying either said desired angular orientation input signals or said reference input signal to said input terminal of said control circuit in such a manner that said rudder is placed in said neutral reference axis when said reference input signal is applied to said input terminal of said control circuit by said switching mechanism for zero-point calibration.

2. An improved auto-steering system as claimed in claim 1 wherein:
said switching mechanism includes a plurality of input contacts,
one of said input contacts is coupled to said reference input circuit, and
remaining of said input contacts are coupled to said sensor circuit.

3. An improved auto-steering system as claimed in claim 1 wherein said control circuit includes a feedback path and wherein said system further comprises an indicator circuit having a high impedance input which is coupled to said feedback path of said control circuit and including a visual indicator of the actual rudder angle.

4. An improved auto-steering system for controlling the angular orientation of a rudder with respect to a neutral reference axis, said auto-steering system comprising:
a control circuit for adjusting the angular orientation of said rudder as a function of input signals applied to an input terminal thereof, said control circuit including a feedback path;
a sensor circuit including means for generating desired angular orientation input signals representative of a desired angular orientation of said rudder responsive to environmental factors influencing navigation;
a reference input signal which produces a predetermined reference input signal indicative of said neutral reference axis of said rudder;
a switching mechanism for selectively applying either said desired angular orientation input signal or said predetermined reference input signal to said input terminal of said control circuit in such a manner that said rudder is placed in said neutral reference axis when said reference input signal is applied to said input terminal of said control circuit by said switching mechanism for zero-point calibration; and
an indicator circuit having a high impedance input coupled to said feedback path of said control circuit and including a visual indicator of the actual orientation of said rudder, a second input terminal coupled to a variable resistor adapted for zero-point calibration of said indicator circuit and a variable resistor associated with said visual indicator for adjusting the moving ambit of an indicator hand of said visual indicator.

5. An improved auto-steering system as claimed in claim 4 in which the moving angle of said indicator hand is proportional to the actual rudder angle.

6. An improved auto-steering system for controlling the angular orientation of a rudder with respect to a neutral reference axis, said auto-steering system comprising:
a control circuit for adjusting the angular orientation of said rudder as a function of input signals applied to an input terminal thereof;
a sensor circuit including means for generating desired angular orientation input signals representative of a desired angular orientation of said rudder responsive to environmental factors influencing navigation;
a reference input circuit which produces a predetermined reference input signal indicative of said neutral reference axis of said rudder;
a switching mechanism for selectively applying either said desired angular orientation input signal or said predetermined reference input signal to said input terminal of said control circuit in such a manner that said rudder is placed in said neutral reference axis when said reference input signal is applied to said input terminal of said control circuit by said zero switching mechanism for zero-point calibration; and
a main A-M switching mechanism inserted between said switching mechanism and said control circuit, said main A-M switching mechanism being adapted for switching between automatic and manual steerings for navigation, and
a remote steering unit coupled to said main A-M switching mechanism, said remote control unit including a manual steering circuit and a subsidiary A-M switch which is operationally locked to said main A-M switching mechanism.

7. An improved auto-steering system as claimed in claim 6 in which said main A-M switching mechanism includes a relay which is activated by said subsidiary A-M switch of said remote steering unit and a main A-M switch which is operated by said relay.

8. An improved auto-steering system as claimed in claim 7 in which said main A-M switch has two input contacts,
one of said input contacts is coupled to said switching mechanism, and
the other of said input contacts is coupled to one terminal of said manual steering circuit.

9. An improved auto-steering system as claimed in claim 7 in which said subsidiary A-M switch has two contacts, and
one of said contacts is coupled to said relay of said main A-M switching mechanism.

10. An improved auto-steering system as claimed in claim 6 in which said manual steering circuit includes a variable resistor whose resistance can be manually adjusted.

11. An improved auto-steering system as claimed in claim 10 in which said manual steering circuit further includes an additional variable resistor coupled in series to said variable resistor and adapted for trimming of said manual steering circuit.

12. An improved auto-steering system as claimed in claim 11 in which said additional variable resistor for trimming is accompanied by means for provisionally fixing the selected resistance thereof.

13. An improved auto-steering system as claimed in claim 10 in which said manual steering circuit further includes means for automatically resetting same to the zero-point after the manual steering is completed.

14. An improved auto-steering system as claimed in claim 13 in which
said variable resistor includes a resistor element and a slide movable along said resistor element when manually biased, and
said automatic resetting means include a spring mechanism always resiliently urging said slide to be registered at the middle of said resistor element.

* * * * *